March 10, 1936.  W. H. BASELT  2,033,319
BRAKE
Filed Aug. 5, 1931  2 Sheets-Sheet 1
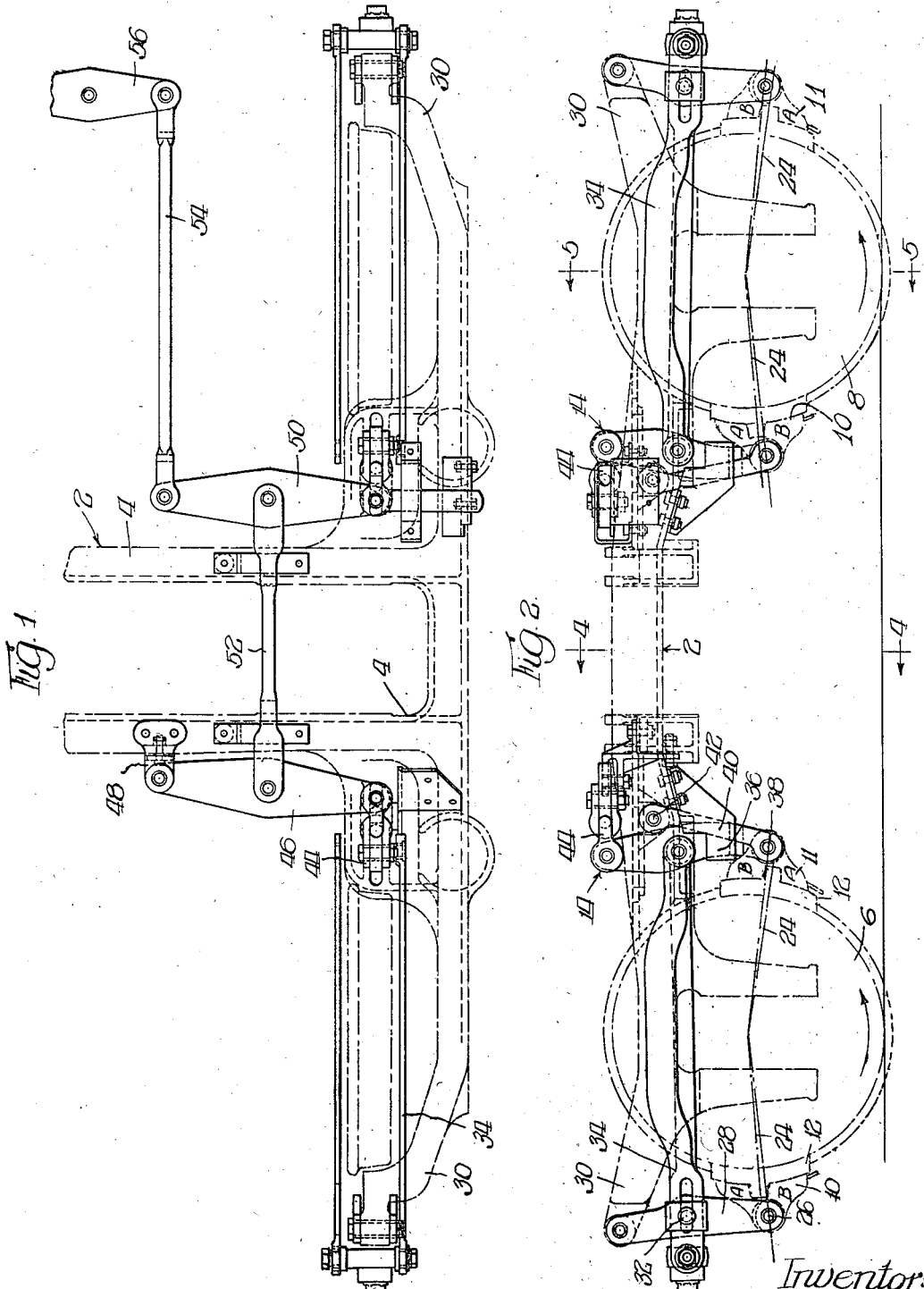
Inventor:
Walter H. Baselt,
By Wilkinson, Huxley, Byron & Knight
Attys.

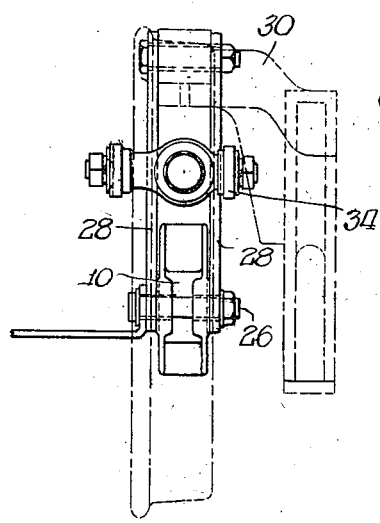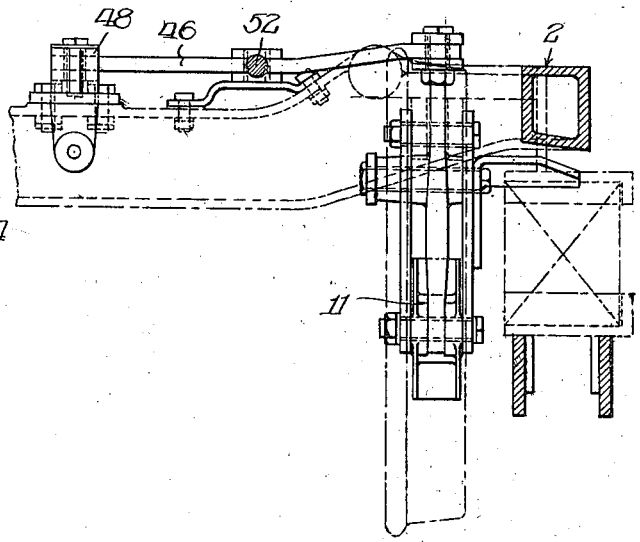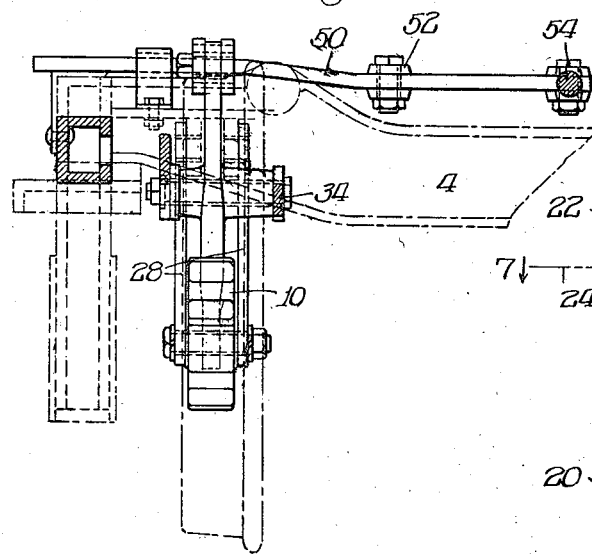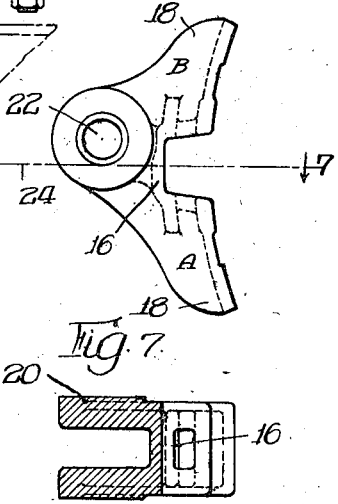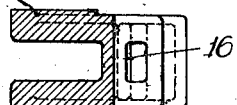

Patented Mar. 10, 1936

2,033,319

UNITED STATES PATENT OFFICE 2,033,319

BRAKE

Walter H. Baselt, Chicago, Ill., assignor to American Steel Foundries, Chicago, Ill., a corporation of New Jersey Application August 5, 1931, Serial No. 555,207

23 Claims. (Cl. 188—56)

The present invention relates to brake mechanisms, and more particularly to brake mechanisms better known as the clasp type brake for railway cars.

Among the objects of the present invention is to provide a novel brake mechanism for railway cars wherein the braking element thereof is adapted to apply an equalized unit pressure along its face to the car wheels.

Another object of the present invention is to provide a novel brake mechanism of the clasp brake type including a brake shoe adapted to be moved into engagement with the surface of a car wheel in such a manner as to effect an equalized unit pressure along the face of the shoe and against the surface of said wheel, thus eliminating uneven wear upon the brake shoe of the mechanism.

The invention comprehends the idea of providing a novel brake mechanism of the clasp brake type having means for moving a brake shoe thereof into engagement with the surface of a car wheel, the application of this moving force being offset relative to the center of pressure of the brake shoe, whereby the unit pressure along the face of the shoe and acting upon or against the surface of the wheel is equalized thereby eliminating any possibility of uneven wear of the brake shoe.

The invention further contemplates the idea of providing a brake mechanism having one brake element for engagement with the surface of a car wheel but, more in particular a brake mechanism for use in a one-way operated car including a pair of brake shoes oppositely disposed on each side of each of the wheels thereof. In such an arrangement, the operating brake levers are connected for application of the applied braking force to the brake heads carrying the brake shoes in opposite offset relation relative to the center line of the brake heads and the brake shoes, whereby the unit pressure along the face of the shoes and applied to each side of the car wheel, is equalized thus eliminating any possibility of uneven wear to the brake shoes as would be experienced were the connections in line with the center of the brake shoes.

A still further object of the invention is to provide a novel brake head for use in a brake mechanism of the clasp brake type and for carrying a brake shoe, the same being provided with connecting means for a brake lever in offset relation relative to the center line thereof and so constructed as to be interchangeably used on either side of a car wheel.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a car truck assembly embodying the present invention;

Figure 2 is a view in side elevation of the car truck assembly disclosed in Figure 1 of the drawings;

Figure 3 is a fragmentary end elevation of a side of the assembly disclosed in Figure 1 of the drawings;

Figure 4 is a transverse fragmentary sectional elevation taken substantially in the plane as indicated by the line 4—4 of Figure 2;

Figure 5 is a transverse fragmentary sectional elevation taken substantially in the plane as indicated by the line 5—5 of Figure 2;

Figure 6 is a plan view of a brake head constructed in accordance with the invention; and Figure 7 is a sectional plan taken in the plane as indicated by the line 7—7 of Figure 6.

Referring now more in detail to the drawings, an embodiment of the present invention is disclosed in connection with a four-wheel car truck 2, having a truck frame 4, and front and rear wheels 6 and 8, respectively, properly journaled in the frame 4 and on each side thereof.

Positioned on opposite sides of each of the wheels 6 and 8 are brake heads 10 and 11 carrying a brake shoe 12 adapted to be moved by brake mechanism, generally designated as 14, into surface engagement with the tread of the wheels.

Each of the brake mechanisms 14, for operating the brake shoes positioned on opposite sides of the wheels 6 and 8, are of similar construction with the exception that the various levers are reversed or in opposite hand relative to one another for each of the wheels 6 and 8. Each of the brake heads comprises a body portion 16 having laterally disposed arms 18 having an arcuate shaped surface for retention of the brake shoes 12. The body portion comprises spaced walls 20 having aligned openings 22, the center of which are offset relative to the transverse center line 24 of the brake head, for a purpose to be hereinafter more fully disclosed.

The brake head 10 is pivotally connected by means of a bolt 26 to a dead truck lever 28 fulcrumed to the end of the truck frame 30, this lever 28 being connected by means of a bolt 32, or the like, intermediate its ends to a brake or pull rod 34. The brake head 11 is pivotally connected to a live truck lever 36 by means of a bolt or the like 38, pivotally supported in the openings of the brake head and being pivotally mounted in an auxiliary or brake hanger 40 connected, as by means of a bolt 42, to the car frame 4. The brake lever 36 pivotally carries the brake or pull rod 34 intermediate its ends and is in turn pivotally connected at its upper end to a link 44 connected to the end of a dead truck lever 46 movably supported upon a bracket 48 secured to the frame 4.

The brake mechanism for the car wheel 8 is of a similar construction and is operatively associated with a live truck lever 50, which is operatively connected through the cross bar or pull rod 52 with the dead truck lever 46, this live truck lever 50 having its inner end pivotally connected with a link or pull rod 54 connected to an equalizer lever 56 which is operated by the piston of a brake cylinder (not disclosed) and/or by hand operating means.

In constructions of the type herein disclosed, it has been the practice heretofore to provide openings, such as the openings 22, in alignment with the center line 24 of the brake head to provide a connection for the head with brake levers such as 28 and 36. In such a construction it has been found that upon application of the brake shoes 12 to the surface of the car wheels, the same become worn unevenly, thereby making it necessary to more frequently replace or repair the brake shoes. This uneven wear of the brake shoes not only requires the early replacement of the same, but during the application of the shoes to the surface of the car wheels the unit pressure against the wheels is uneven along the face of the shoes.

Therefore, in order to overcome these disadvantages, the connection between the brake levers and brake heads have been offset relative to the center line of the heads and center of pressure of the brake shoes, in order that an equalized unit pressure may be applied to the surface of the car wheels.

In the drawings, the present invention is disclosed in connection with a four-wheel car truck, movable, as viewed in Figure 2 of the drawings, from right to left. Referring more particularly to Figure 2, it will be seen that the openings 22 of the brake head 10 for the connection between the same and the lever 28 are offset downwardly relative to the center line 24 of the brake head 10. This offsetting of the connection between the head 10 and lever 28 in a downward direction relative to the center line 24 prevents any greater wear at the top of the brake shoe 12 on this side of the wheel. The connection between the brake head 11 and the levers 36 and 40 is offset upwardly relative to the center line 24 so as to eliminate any possibility of greater wear at the bottom of the shoe 12 on this side of the car wheel.

It will be noted that the connections for the brake heads 10 and 11 are offset in opposite directions relative to the center line of their respective heads. The invention, therefore, contemplates the idea of providing a brake head, such as that disclosed in Figure 6 of the drawings, adapted for use on either side of a car wheel, it being necessary only to reverse or turn the same end for end for its proper use on either of the two sides of the car wheel.

As above indicated, the brake heads for all of the wheels are of similar construction but are disposed in reverse direction on opposite sides of each of the wheels whereby an equalized unit pressure over the surface is effected when the same are operated. In Figure 2 the relation of these brake heads is clearly disclosed, and it will be understood that the same are associated with the wheels for the front truck in a similar manner as with the rear truck. In each case, the connection between the truck levers and the brake heads on opposite sides of the wheel is offset from the center of the brake head in the direction of rotation of the wheel, i. e., toward that portion of the brake heads marked B or counter-clockwise. The portion of the brake heads marked A is oppositely disposed relative to the center of the brake heads on opposite sides of the wheels. It will be readily apparent that the brake heads are adapted to be used on either side of the wheels. When the brake heads are assembled, that portion of the brake head marked A is placed at the top when the brake head is used on the front side of the wheel, considered from the direction in which the wheel is traveling, and that portion of the brake head marked B is placed at the bottom. On the other hand, when the brake head is placed at the rear of the wheel, that portion marked A is placed at the bottom and the portion marked B is placed at the top.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a one-way operated car, the combination of car wheels and a clasp brake mechanism, said mechanism including a brake head positioned on opposite sides of each of said wheels, shoes carried by each of said heads, and brake levers connected to said heads, the connection of one of said levers being offset relative to a center line of said head in a direction opposite to the offset connection of the other of said levers, and means for movement of said levers whereby an equalized unit pressure against the surface of said shoes is effected.

2. In a car, the combination of car wheels, a brake mechanism therefor, said mechanism including brake elements disposed on opposite sides of each of said wheels, and means connected to said elements for operating the same for cooperative engagement with said wheels, said connections being offset relative to the center of said elements in the direction of rotation of said wheels.

3. In a car, the combination of car wheels, a brake mechanism therefor, said mechanism including brake elements disposed on opposite sides of each of said wheels, and means connected to said elements for operating the same for cooperative engagement with said wheels, said connections on one side of said wheels being below and on the other side above the center of said elements.

4. In a car, the combination of car wheels, a brake mechanism therefor, said mechanism including brake elements disposed on opposite sides of each of said wheels, and means connected to said elements for operating the same for cooperative engagement with said wheels, said connections on opposite sides of said wheels being in opposite relation relative to the center of said elements.

5. In a car, the combination of car wheels, a brake mechanism therefor, said mechanism including brake elements cooperating with each of said wheels, and means connected to said elements for operating the same for cooperative engagement with said wheels, said connections being offset relative to the center of said elements in the direction of rotation of said wheels.

6. In a car, the combination of a car wheel, a brake mechanism therefor, said mechanism including brake elements disposed on opposite sides of said wheel, and means for applying pressure to said elements, said means being connected to said elements in offset relation relative to the center of said elements in the direction of rotation of said wheel whereby an equalized unit pressure along the face of said elements is effected when the same are in cooperative relation with said wheel.

7. In a car, the combination of a car wheel, a brake mechanism therefor, said mechanism including brake elements disposed on opposite sides of said wheel, and means for applying pressure to said elements, said means being connected to said elements on opposite sides of said wheel in opposite relation relative to the center of said elements whereby an equalized unit pressure along the face of said elements is effected when the same are in cooperative relation with said wheel.

8. In a car, the combinaiton of a car wheel, a brake mechanism therefor, said mechanism including brake elements disposed on opposite sides of said wheel, and means for applying pressure to said elements, said means being connected in offset relation to the center of said elements, said connections on one side of said wheel being below and on the other side above the center of said elements whereby an equalized unit pressure along the face of said elements is effected when the same are in cooperative relation with said wheel.

9. In a car, the combination of spaced car wheels, a brake mechanism therefor, said mechanism including a brake element disposed on one side of one of said wheels and a brake element on the opposite side of the other wheel, and means connected to said elements for operating the same for cooperative engagement with said wheels, said connections being in opposite relation relative to the center of said elements whereby an equalized unit pressure along the face of said elements is effected when the same are in cooperative relation with said wheels.

10. In a car, the combination of spaced car wheels, a brake mechanism therefor, said mechanism including a brake element disposed on one side of one of said wheels and a brake element on the opposite side of the other wheel, and means connected to said elements for operating the same for cooperative engagement with said wheels, said connections being offset relative to the center of said elements in the direction of rotation of said wheels whereby an equalized unit pressure along the face of said elements is effected when the same are in cooperative relation with said wheels.

11. In a car, the combination of spaced car wheels, a brake mechanism therefor, said mechanism including a brake element disposed on one side of one of said wheels and a brake element on the opposite side of the other wheel, and means connected to said elements for operating the same for cooperative engagement with said wheels, said connections for one of said wheels being below and for the other of said wheels above the center of said elements whereby an equalized unit pressure along the face of said elements is effected when the same are in cooperative relation with said wheels.

12. In a car, the combination of a car wheel, brake mechanism therefor, said mechanism including a brake element disposed to cooperate with said wheel, and means for operating said element, said means being connected to said element in offset relation to the center thereof in the direction of rotation of said wheel for moving said element into cooperative engagement with said wheel, the connection being so offset as to cause an equalized unit pressure along the face of said element.

13. In a brake arrangement, the combination of a wheel intended normally to roll in one direction, a brake lever disposed adjacent the periphery of said wheel and on that side of said wheel toward which said wheel normally is intended to roll, a brake lever disposed adjacent the periphery of said wheel and at the opposite side of said wheel from said first named brake lever, a brake head having a shoe thereon and secured to each of said brake levers, the securing points of said heads being the points of applied force to said heads to apply the shoe to its wheel, said securing points being offset in the direction of rotation of the wheel whereby the points of application of force are eccentric with respect to the center line of each shoe to equalize the unit pressure on the face of each shoe.

14. In a brake arrangement, the combination of a wheel intended normally to roll in one direction, a brake lever disposed adjacent the periphery of said wheel and on that side of said wheel toward which said wheel normally is intended to roll, a brake head having a shoe thereon and secured to said brake lever, the securing point of said head being the point of applied force to said head to apply the shoe to the wheel, said securing point being offset in the direction of rotation of the wheel whereby the point of application of force is eccentric with respect to the center line of the shoe to equalize the unit pressure on the face of said shoe.

15. In a brake arrangement, the combination of a wheel intended normally to roll in one direction, a brake lever disposed adjacent the periphery of said wheel and on that side of the wheel opposite to that in which the wheel normally is intended to roll, a brake head having a shoe thereon and secured to said brake lever, the securing point of said head being the point of applied force to said head to apply the shoe to the wheel, said securing point being offset in the direction of rotation of the wheel whereby the point of application of force is eccentric with respect to the center line of the shoe to equalize the unit pressure on the face of said shoe.

16. In a brake arrangement, the combination of a wheel intended normally to roll in one direction, a brake lever disposed adjacent the periphery of said wheel and on that side of said wheel toward which said wheel normally is intended to roll, a brake lever disposed adjacent the periphery of said wheel and at the opposite side of said wheel from said first named brake lever, a brake head having a shoe thereon and secured to each of said brake levers, the securing points of said heads being the points of applied force to said heads to apply the shoe to its wheel, the securing point of one of the brake heads with respect to its respective lever being below the center line of its shoe, and the securing point of the other of the brake heads with respect to its respective lever being above the center line of its shoe.

17. In a brake arrangement, the combination of a pair of wheels intended normally to roll in one direction, a brake lever disposed adjacent the periphery of each wheel and in the direction in which said wheels normally are intended to roll, a brake lever disposed adjacent the periphery of each wheel and at the opposite sides of said wheels from said first named brake levers, a brake head having a shoe thereon and secured to each of said brake levers, the securing points of said heads being the points of applied force to said heads to apply the shoe to its wheel, said securing points being offset in the direction of rotation of the wheel whereby the points of application of force are eccentric with respect to the center line of each shoe to equalize the unit pressure on the face of each shoe.

18. In a brake arrangement, the combination of a pair of wheels intended normally to roll in one direction, a brake lever disposed adjacent the periphery of each wheel and in the direction in which said wheels normally are intended to roll, a brake head having a shoe thereon and secured to each of said brake levers, the securing points of said heads being the points of applied force to said heads to apply the shoe to its wheel, said securing points being so offset in the direction of rotation of the wheel that the points of application of force are eccentric with respect to the center line of each shoe and an equal unit braking pressure is obtained on the face of each shoe.

19. In a brake arrangement, the combination of a pair of wheels intended normally to roll in one direction, a brake lever disposed adjacent the periphery of each wheel and in the direction opposite to that in which said wheels normally are intended to roll, a brake head having a shoe thereon and secured to each of said brake levers, the securing points of said heads being the points of applied force to said heads to apply the shoe to its wheel, said securing points being so offset in the direction of rotation of the wheel that the points of application of force are eccentric with respect to the center line of each shoe and an equal unit braking pressure is obtained on the face of each shoe.

20. In a brake arrangement, the combination of a pair of wheels intended normally to roll in one direction, a brake lever disposed adjacent the periphery of each wheel, one of said levers being at the side of the wheel in the direction in which said wheels normally are intended to roll, and the other lever being disposed adjacent the side of the other wheel opposite to the direction of roll, a brake head having a shoe thereon and secured to each of said brake levers, the securing points of said heads being the points of applied force to said heads to apply the shoe to its wheel, said securing points being so offset in the direction of rotation of the wheel that whereby the points of application of force are eccentric with respect to the center line of each shoe and an equal unit braking pressure is obtained on the face of each shoe.

21. In a brake arrangement, the combination of a pair of wheels intended normally to roll in one direction, a brake lever disposed adjacent the periphery of each wheel and between said wheels, a brake head having a shoe thereon and secured to each of said brake levers, the securing points of said heads being the points of applied force to said heads to apply the shoe to its wheel, said securing points being so offset in the direction of rotation of the wheel that whereby the points of application of force are eccentric with respect to the center line of each shoe and an equal unit braking pressure is obtained on the face of each shoe.

22. In a brake arrangement, the combination of a pair of wheels intended normally to roll in one direction, a brake lever disposed adjacent the periphery of each wheel, the wheels being between said levers, a brake head having a shoe thereon and secured to each of said brake levers, the securing points of said heads being the points of applied force to said heads to apply the shoe to its wheel, said securing points being so offset in the direction of rotation of the wheel that whereby the points of application of force are eccentric with respect to the center line of each shoe and an equal unit braking pressure is obtained on the face of each shoe.

23. In a brake arrangement, the combination of a wheel, a brake lever disposed adjacent the periphery of said wheel, a brake head having a shoe thereon and secured to said brake lever, the securing point of said head being the point of applied force to said head to apply the shoe to the wheel, said securing point being so offset in the direction of rotation of the wheel that whereby the point of application of force is eccentric with respect to the center line of the shoe and an equal unit braking pressure is obtained on the face of said shoe.

WALTER H. BASELT.

CERTIFICATE OF CORRECTION.

Patent No. 2,033,319.  March 10, 1936.

WALTER H. BASELT.

It is hereby certified that error appears in the printed specification of the above numbered patent requiring correction as follows: Page 4, second column, lines 11, 25, 40 and 51-52, claims 20, 21, 22 and 23 respectively, strike out the word "whereby"; and that the said Letters Patent should be read with this correction therein that the same may conform to the record of the case in the Patent Office.

Signed and sealed this 21st day of April, A. D. 1936.

Leslie Frazer
Acting Commissioner of Patents.

(Seal)